(12) United States Patent
Shinkawa et al.

(10) Patent No.: US 8,239,470 B2
(45) Date of Patent: Aug. 7, 2012

(54) SCHEDULE ADJUSTMENT ASSISTING APPARATUS, METHOD AND PROGRAM

(75) Inventors: Kaoru Shinkawa, Kanagawa (JP); Susumu Sugihara, Kanagawa (JP); Yoshinori Tahara, Kanagawa (JP); Tamayo Takagi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 12/786,404

(22) Filed: May 24, 2010

(65) Prior Publication Data
US 2010/0306327 A1   Dec. 2, 2010

(30) Foreign Application Priority Data

May 28, 2009   (JP) .................................. 2009-128899

(51) Int. Cl.
*G06F 15/16* (2006.01)
(52) U.S. Cl. ....... 709/206; 709/203; 709/204; 705/7.13; 705/7.16; 705/7.18; 715/751; 715/752; 715/753
(58) Field of Classification Search .................. 709/203, 709/204, 205, 206, 207; 705/7.13, 7.16, 705/7.18, 7.22; 715/751, 752, 753; 379/88.22
See application file for complete search history.

(56) References Cited

U.S. PATENT DOCUMENTS

| | | | |
|---|---|---|---|
| 2003/0144893 A1* | 7/2003 | Kawabata et al. | 705/8 |
| 2008/0005247 A9* | 1/2008 | Khoo | 709/206 |

* cited by examiner

*Primary Examiner* — Frantz Jean
(74) *Attorney, Agent, or Firm* — Steven M. Greenberg, Esq.; Carey, Rodriguez, Greenberg & O'Keefe (57) ABSTRACT

In response to a request from a user, multiple reply mails are accessed and a changed portion for each of the reply mails is determined. Here, when the reply mail has a quotation from a past mail in the body and when the quotation includes newly-added information, a part where the information is added is determined as the changed portion. Otherwise, an original reply part in the body of the current mail is determined as the changed portion. Then, schedule information on a schedule is extracted from the changed portion. Based on the schedule information, summary information including a schedule of each person is created.

11 Claims, 9 Drawing Sheets

From: BBB
To: YYY
Cc: AAA, CCC

DEAR YYY,
MY SCHEDULE IS AS FOLLOWS.

} QUOTATION FROM PARENT MAIL (NODE 1)

From: AAA
To: YYY
Cc: BBB, CCC

DEAR YYY,
THANK YOU.
I WROTE MY SCHEDULE IN THE TABLE.

} QUOTATION FROM ORIGINAL MAIL (NODE 0)

From: YYY
To: AAA, BBB, CCC

DEAR AAA, BBB, AND CCC
I WOULD LIKE TO HAVE A MEETING
REGARDING THE TOPIC IN THE TITLE.
PLEASE LET ME KNOW YOUR CONVENIENT
DATES IN THE TABLE BELOW.

(b)

| NODE 0 | NODE 1 | NODE 2 | NODE 3 | NODE 4 | NODE 5 | NODE 6 |
|---|---|---|---|---|---|---|
| | REPLY MAIL 1 | REPLY MAIL 2 | REPLY MAIL 3 | REPLY MAIL 4 | REPLY MAIL 5 | REPLY MAIL 6 |
| INQUIRY MAIL | INQUIRY MAIL | REPLY MAIL 1 | REPLY MAIL 2 | REPLY MAIL 1 | INQUIRY MAIL | REPLY MAIL 5 |
| | | INQUIRY MAIL | REPLY MAIL 1 | INQUIRY MAIL | | INQUIRY MAIL |
| | | | INQUIRY MAIL | | | |

| MAIL ID | NAME | DATE | TIME | OTHER | TIMESTAMP |
|---|---|---|---|---|---|
| 1 | AAA | 6/20<br>6/21 | 10:00 - 15:00<br>13:00 - 16:00 | — | 2009-06-19 09:12:35 |
| 2 | BBB | — | — | I AM AVAILABLE ALL DAY TOMORROW | 2009-06-19 12:30:31 |
| 3 | abc@xxx.com | 6/20<br>6/21<br>6/25 | 9:30 - 15:00<br>13:00 - 15:00<br>PM | — | 2009-06-19 15:11:09 |
| 4 | AAA | 6/20<br>6/21 | 12:00 - 15:00<br>13:00 - 16:00 | — | 2009-06-19 15:13:58 |

FIG. 8

| | 6/20 | 6/21 | 6/25 | OTHER |
|---|---|---|---|---|
| TARO YAMADA | 12:00 - 15:00 | 13:00 - 16:00 | — | — |
| KEIKO SUZUKI | — | — | — | I AM AVAILABLE ALL DAY TOMORROW |
| JIRO SATO | 9:30 - 15:00 | 13:00 - 15:00 | PM | — |

SCHEDULE ADJUSTMENT ASSISTING APPARATUS, METHOD AND PROGRAM

CROSS-REFERENCE TO RELATED APPLICATIONS

This application claims priority under 35 U.S.C. §119(a) to Japan Patent Application Serial Number 2009128899, filed May 28, 2009, entitled "SCHEDULE ADJUSTMENT ASSISTING APPARATUS, METHOD, AND PROGRAM", the entirety of which is incorporated herein by reference.

BACKGROUND OF THE INVENTION

The present invention relates to a technique for assisting schedule adjustment using emails, and particularly to a technique for automatically creating a summary of multiple reply mails replied to a schedule inquiry mail.

A web-based application program having calendar and scheduling functions has been known conventionally, such as Lotus (trademark) Notes (trademark). There is also known a schedule adjustment system that allows users to communicate with each other through emails to make adjustment of participants' schedules (see, for example, Japanese Patent Application Publication No. 2000-29939).

Schedule adjustment using such an application program as Lotus (trademark) Notes (trademark) works on the premises that the participants use such a common special application program.

Moreover, in order to allow a meeting organizer to check the schedules of other users, such application program requires pre-authorization of the meeting organizer for accesses to the calendars of the other users, or requires a group registration of all the participants.

On the other hand, the schedule adjustment system using emails makes adjustment on meeting arrangement by performing the following control: meeting schedule is arranged tentatively based on information on the meeting using a meeting room and based on a result of search that a meeting-room reservation system makes in reference to that information; the tentative meeting schedule is sent through an e-mail to terminals associated with the meeting schedule adjustment; and then the meeting schedule is rearranged on a result of interpretation of a reply from each of the terminals in response to the sent meeting schedule. Accordingly, this system allows people not using the special application program to be included as participants.

In the above schedule adjustment system, however, the reply from each of the prospective meeting participants is processed by extracting availability, a list of candidate dates and times, and a meeting arrangement ID from reply items inputted in the reply mail or through a browsing software. In other words, the prospective meeting participants are required to input their replies in a predetermined format in a predetermined field in their reply mails or on a screen of the browsing software. Accordingly, the prospective meeting participants are not allowed to reply in free format. A reply not in the predetermined format is not processed or causes an error.

SUMMARY OF THE INVENTION

The present invention has been made to solve the above problem, and aims to provide a technique for schedule adjustment using emails, in which recipients of a schedule inquiry mail are allowed to reply with their schedules in free format. In other words, the present invention also aims to provide a technique for automatically extracting and summarizing schedule information of the recipients from their reply mails in free format.

In order to solve the problems above, as an aspect of the present invention, provided is a schedule adjustment assisting program executed in an information processing apparatus including a processor and storage means, the information processing apparatus being capable of accessing a plurality of reply mails either directly or indirectly replied to a schedule inquiry mail, the schedule adjustment assisting program causing the information processing apparatus to execute the steps of: (a) the processor accessing the plurality of reply mails in response to a request from a user of the information processing apparatus; (b) the processor determining that a changed portion in each of the reply mails is a part where information is newly added, on condition that a body of the reply mail includes a quotation from a past mail and that the newly-added information is in the quotation, and otherwise, determining that the changed portion is an original reply part in the body of the current mail; (c) for each of the reply mails, the processor extracting schedule information on a schedule from the changed portion, and storing the schedule information in the storage means and a sender identifier of the reply mail in association with each other; and (d) the processor reading a combination of the schedule information and the corresponding sender identifier from the storage means, and creating summary information including a schedule of each person replied to the schedule inquiry mail.

Preferably, the step (b) includes a step of, for each of the reply mails, the processor comparing the quotation from the past mail in the body of the reply mail with a parent mail to which the reply mail has been replied, and determining whether or not the body of the reply mail includes newly-added information in the quotation from the past mail.

More preferably, the program further causes the information processing apparatus to execute a step of, for each of the reply mails, the processor adding a copy of the parent mail of the reply mail to the body of the reply mail on condition that the body of the reply mail does not include the quotation from the past mail.

Preferably, the step (b) includes a step of, on condition that a portion to be determined as the changed portion is part of a table or includes a table, the processor determining the entire table as the changed portion, and the step (c) includes a step of, on condition that the changed portion includes a table, the processor extracting the schedule information from the table only.

Preferably, the step (b) includes a step of, on condition that a portion to be determined as the changed portion is part of a list or includes a list, the processor determining an entire row of the list as the changed portion, and the step (c) includes a step of, on condition that the changed portion includes a row of a list, the processor extracting the schedule information from the changed portion only.

Preferably, the information processing apparatus includes rule-information storage means for storing rule information for specifying the schedule information, and the step (c) includes a step of the processor extracting the schedule information from the changed portion in reference to the rule information.

Preferably, the step (c) includes a step of, on condition that the rule-information storage means does not store the rule information usable, the processor extracting the entire changed portion as the schedule information.

Preferably, the step (c) includes a normalizing step of the processor normalizing the extracted schedule information into a predetermined format, and the schedule adjustment assisting program further causes the information processing apparatus to execute a step of the processor outputting the created summary information to an output unit of the information processing apparatus.

Preferably, the step (c) includes a step of the processor storing the extracted schedule information and timestamp information of the reply mail from which the schedule information is extracted, in the storage means in association with each other, and the step (d) includes a step of, on condition that the storage means stores a plurality of pieces of the schedule information having the same sender identifier, the processor creating the summary information by using a combination of the schedule information associated with the latest timestamp information and the same sender identifier.

The present invention has been described above as the schedule adjustment assisting program executed in the information processing apparatus capable of accessing multiple reply mails either directly or indirectly replied to a schedule inquiry mail. The present invention may also be implemented as a schedule adjustment assisting method executed in the information processing apparatus capable of accessing multiple reply mails either directly or indirectly replied to a schedule inquiry mail, or as a schedule adjustment assisting apparatus.

DETAILED DESCRIPTION OF THE PREFERRED EMBODIMENT

Figure 1:
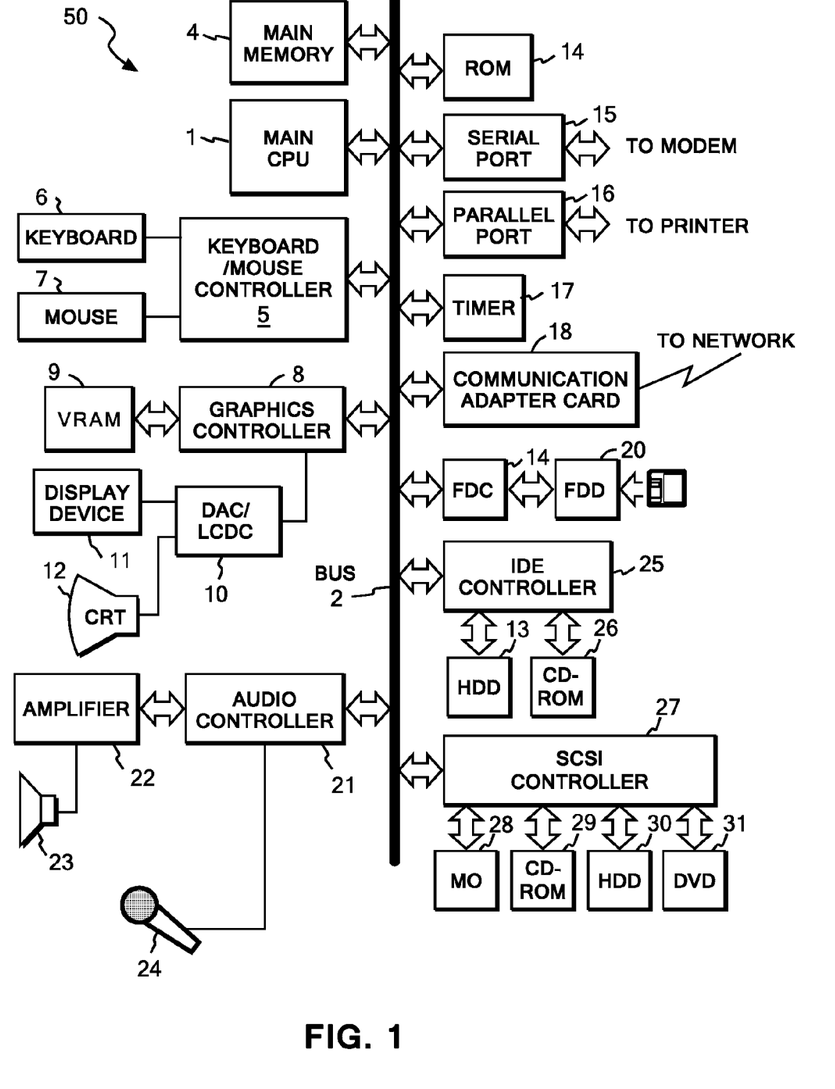
FIG. 1 shows a hardware configuration example of a computer 10 according to an embodiment.

FIG. 1 is a diagram showing an example of a hardware configuration of a computer suitable for implementing a schedule adjustment assisting apparatus 100 according to the embodiment of the present invention. The computer includes a central processing unit (CPU) 1 and a main memory 4 that are connected to a bus 2. Hard disk devices 13 and 30 and removal storages (external storage systems in which recording media are switchable), such as CD-ROM devices 26, 29, a flexible disk device 20, an MO device 28, and a DVD device 31, are each connected to the bus 2 through a corresponding one of a flexible-disk controller 19, an IDE controller 25, an SCSI controller 27, and the like.

A recording medium, such as a flexible disk, an MO, a CD-ROM, or a DVD-ROM, is inserted into the corresponding removable storage. These recording media, the hard disk device 13, 30, and a ROM 14 can store computer program code for instructing the CPU and the like in cooperation with an operating system to implement the present invention. In other words, the various above-described storage devices of the computer functioning as the schedule adjustment assisting apparatus 100 can store a schedule adjustment assisting program according to the present invention, as well as various data, such as rules, referred to extract schedule information to be described later. Then, multiple computer programs are executed by being loaded on the main memory 4. The computer programs can be stored in a compressed form or can be divided to be stored in two or more media.

The computer receives input from input devices, such as a keyboard 6 and a mouse 7, through a keyboard/mouse controller 5. The computer receives input from a microphone 24 through an audio controller 21, and outputs a voice from a loudspeaker 23. Through a graphics controller 8, the computer is connected to a display device 11 for presenting visual data to a user. The computer can communicate with another computer or the like by being connected to a network through a network adapter 18 (an Ethernet (R) card or a token-ring card) or the like.

From the above description, it should be easily understood that the computer preferred for implementing the schedule adjustment assisting apparatus 100 according to the embodiment of the present invention can be implemented with a regular information processing device such as a personal computer, a work station, or a main frame, or with a combination of these. Note that the constituents described above are mere examples, and not all the constituents are essential to the present invention.

Figure 2:
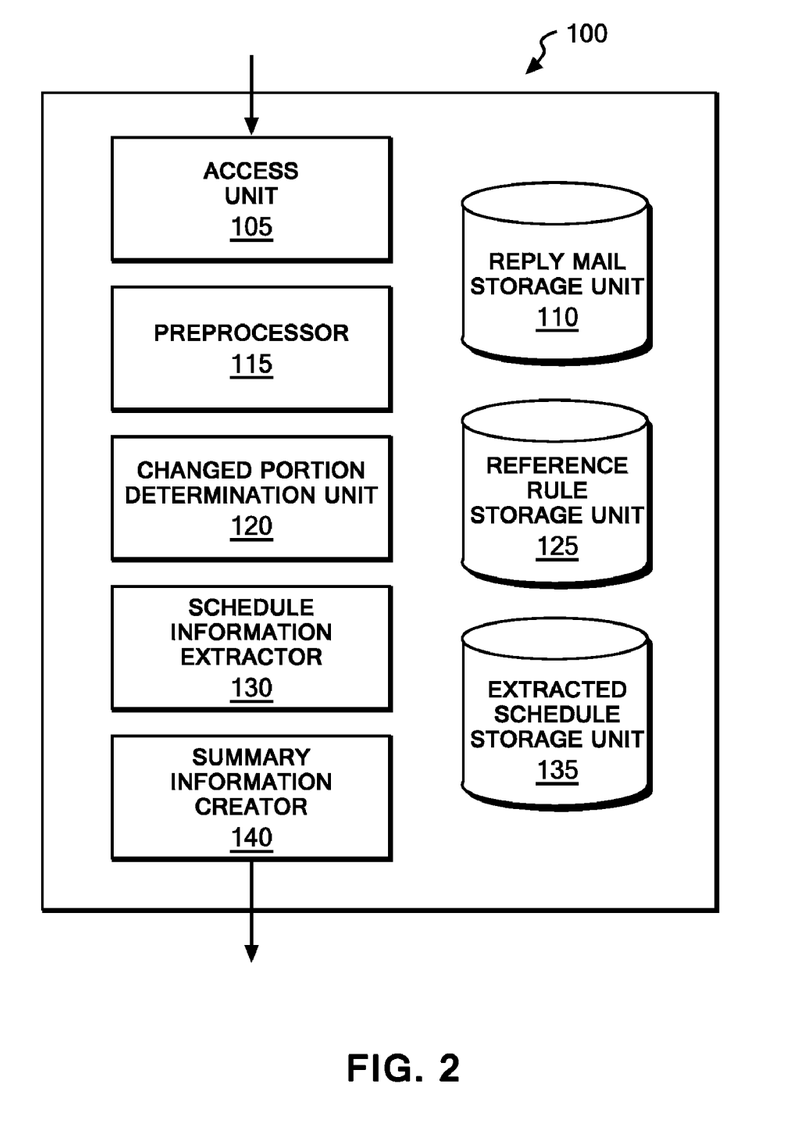
FIG. 2 shows a functional configuration of a schedule adjustment assisting apparatus 100 according to the embodiment.

FIG. 2 shows a function configuration of the schedule adjustment assisting apparatus 100 according to the embodiment. In response to a request to organize reply mails replied to a schedule inquiry mail, the schedule adjustment assisting apparatus 100 extracts schedule information of each person from the reply mails and outputs the extracted information collectively. The schedule adjustment assisting apparatus 100 according to the embodiment includes an access unit 105, a reply mail storage unit 110, a preprocessor 115, a changed portion determination unit 120, a reference rule storage unit 125, a schedule information extractor 130, an extracted schedule storage unit 135, and a summary information creator 140.

Note that the schedule adjustment assisting apparatus 100 is capable of accessing multiple mails either directly or indirectly replied to the schedule inquiry mail. Accordingly, the multiple reply mails may be stored in a storage device connected directly or indirectly to the schedule adjustment assisting apparatus 100, or may be held in another information processing device, such as a mail server, with which the schedule adjustment assisting apparatus 100 can communicate. Accordingly, the schedule adjustment assisting apparatus 100 of the present invention may be implemented as a function of an existing mail server, or as a function of a mail server designed to provide a client with a result of organized reply mails.

The access unit 105 accesses multiple reply mails in response to a request from a user to organize reply mails. The organizing request from the user is made through an input device such as a keyboard or a mouse. In this request, the user either designates the multiple reply mails targeted for the organization directly or designates an original schedule inquiry mail (also called an original mail below). The access unit 105 stores, in the reply mail storage unit 110, the multiple reply mails designated directly or specified based on the original mail. Note that, if the original mail is designated, the access unit 105 may use email header information to specify the reply mails.

RFC2822 states that header information of each mail includes a message ID (Message-ID) and a reply history (In-Reply-To and References). Here, Message-ID is an identifier uniquely identifying emails. In addition, In-Reply-To is for identifying an email to which the mail is replying. This In-Reply-To field includes Message-ID of a parent mail to which the reply mail is replied. Meanwhile, References is for recognizing a subject thread. This References field includes contents and Message-ID of the parent mail in this order. Thus, the access unit 105 can specify all the reply mails replied to the designated original mail by referring to the message IDs and reply histories of the mails based on Message-ID included in the header of the original mail.

Alternatively, the access unit 105 can specify the reply mails based on a combination of information pieces, such as a subject line (Subject), a destination (To, Cc, and Bcc), a sender (Sender), and a date (Date), included in the header information of the original mail. Specifically, the access unit 105 can specify, as a reply mail, a mail that meets all the following conditions (1) to (4):

(1) having any of the destinations (To, Cc, and Bcc) of the original mail in the Sender field, (2) having the Sender of the original mail in any of the destination fields (To, Cc, and Bcc), (3) having a character string "Re" or "Fwd" and a character string representing the subject line of the original mail in the Subject field, and (4) having been transmitted after the date and time (Date) of the original mail.

Note that these conditions are an example of specifying the reply mails based on the original mail, and the reply mails may also be specified using milder or stricter conditions, of course.

The preprocessor 115 reads the reply mails from the reply mail storage unit 110 from the one having the oldest timestamp, and determines, for each of the reply mails, whether the reply mail includes a quotation from a past mail in the body thereof. Having determined that the reply mail includes no quotation from a past mail, the preprocessor 115 adds a copy of the parent mail of the reply mail to the body of the reply mail. This processing is performed so as to eliminate the need to change, depending on whether the reply mail has a history of a past mail or not, the contents of later-described processing of extracting schedule information, which is performed on each reply mail.

Specifically, the preprocessor 115 first specifies a parent mail of each reply mail. Message-ID and In-Reply-To included in the header information described above can be used to specify the parent mails. To be more specific, a parent mail of a certain reply mail is a mail whose Message-ID is a value in the In-Reply-To field of the certain reply mail.

After specifying the parent mail, the preprocessor 115 next compares the body of the reply mail with its parent mail to determine whether the reply mail includes a quotation from the parent mail or not. If the reply mail and the parent mail are found to have a high degree of match as a result of the comparison, the preprocessor 115 determines the reply mail as a reply mail including a quotation from a past mail, namely, as a reply mail with history.

Alternatively, the preprocessor 115 may determine if each reply mail is a reply mail with history or not depending on whether or not the body of the reply mail has a delimiter line sectioning an original reply part from a quotation of a past mail, or whether or not the reply mail has a quotation mark, such as ">" or "|," at each start of lines of the body.

Having determined that a certain reply mail is not with history, the preprocessor 115 adds a copy of its parent mail at the end of the body of the reply mail. Then, the preprocessor 115 updates the reply mail with no history stored in the reply mail storage unit 110 with the reply mail with history. The preprocessor 115 further stores parent information indicating a parent mail of the reply mail in the reply mail storage unit 110 in association with the reply mail. The parent information is, for example, pointer information indicating where the parent mail is stored.

Figure 3:
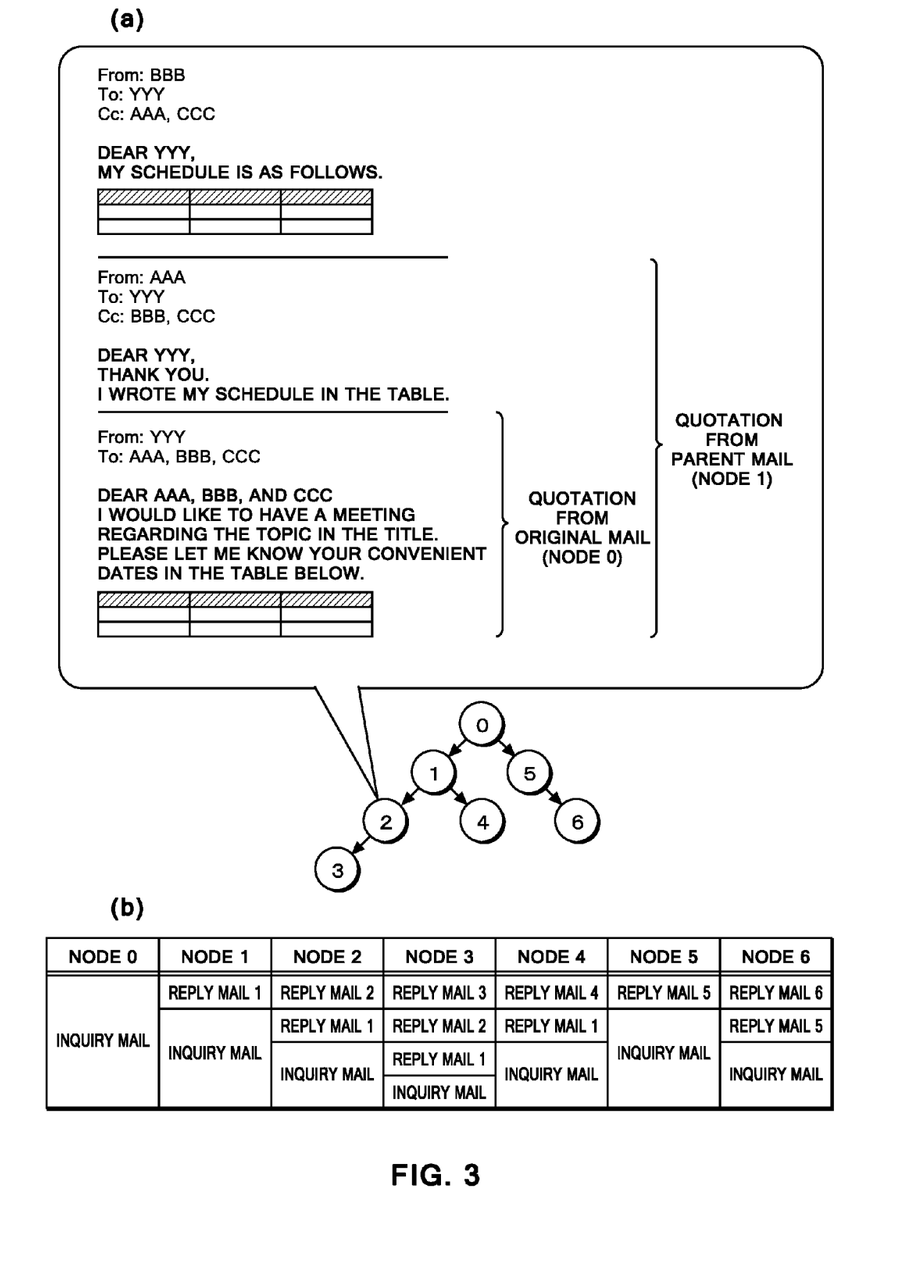
FIG. 3A shows an example of a relationship between a schedule inquiry mail and a group of mails replied to the schedule inquiry mail.
FIG. 3B shows a state after the mails shown in FIG. 3A are subjected to preprocessing.

Now, processing performed by the preprocessor 115 is described with reference to FIGS. 3A and 3B. FIG. 3A is a diagram showing, with a tree structure, a parent-child relationship between a certain original mail and multiple mails replied to the original mail. In FIG. 3A, a circle represents one email, and a number inside the circle represents an identification number of the email. Here, the original mail is represented as Node 0 which is the root node, and the reply mails directly replied to the original mail are represented as Node 1 and Node 5. In addition, the reply mails directly replied to the reply mail of Node 1 are represented as Child Node 2 and Child Node 4 of Node 1. The tree structure showing the parent-child relationship of the reply mails are constructed in the same manner for other reply mails below.

Focusing on Node 2, Node 2 is a reply mail having the reply mail of Node 1 as a parent mail, and Node 1 is a reply mail having the original mail of Node 0 as a parent mail. Accordingly, if the reply mail of Node 2 is not a reply mail with history, the preprocessor 115 adds a copy of the reply mail of Node 1 to the body of the reply mail of Node 2, as shown in a balloon in FIG. 3A. Note that the preprocessor 115 performs the processing from the one having the youngest node identification number, in other words, the one having the oldest timestamp. Accordingly, in processing each reply mail, the parent mail of the reply mail is a reply mail with history unless the parent mail is the original mail.

FIG. 3B shows states of all the nodes shown in FIG. 3A after being processed by the preprocessor 115. For example, focusing on a reply mail 1 of Node 1, the body of the reply mail 1 includes an original new reply part of the reply mail 1 and a quotation copied from the original mail (inquiry mail) which is the parent mail of the reply mail 1. Focusing on a reply mail 2 of Node 2, the body of the reply mail 2 includes an original new reply part of the reply mail 2 and a quotation copied from the reply mail 1 which is the parent mail of the reply mail 2. In this way, after being processed by the preprocessor 115, all of the reply mails stored in the reply mail storage unit 110 include a copy of its parent mail in the body.

The changed portion determination unit 120 reads the reply mails one by one from the reply mail storage unit 110, and determines whether each reply mail has a quotation from a past mail in the body and whether the quotation includes newly-added information. When the quotation includes newly-added information, the changed portion determination unit 120 determines the information-added part as a charged portion. When the quotation does not include newly-added information, the changed portion determination unit 120 determines an original reply part in the body of the reply mail as the changed portion. The changed portion determination unit 120 stores information on the determined changed portion in the reply mail storage unit 110 in association with the corresponding reply mail.

Specifically, for each reply mail, the changed portion determination unit 120 reads the parent information from the reply mail storage unit 110, compares a quotation from a past mail in the body of the reply mail with the parent mail, and determines whether or not the quotation from a past mail in the body of the reply mail includes any newly-added information.

Note that, when a portion to be determined as the changed portion is part of a table or includes a table, the changed portion determination unit 120 determines the entire table as the changed portion. Similarly, when a portion to be determined as the changed portion is part of a list or includes a list, the changed portion determination unit 120 determines an entire row of the list as the changed portion. As for the table, the changed portion determination unit 120 stores record information indicating which record is a newly-added record, in the reply mail storage unit 110 in association with the corresponding reply mail.

Such configuration is employed because of the following reason. In the present invention, a recipient of a schedule inquiry mail is allowed to reply with a schedule in any form. This means that it is difficult to specify, from the reply mail, where schedule information of the replier is written. Hence, the inventors of the present application have noticed that a schedule-inquiry mail generally has a table (or a list in some cases) and that, in a reply to an inquiry mail with a table (or a list), a schedule is written directly in the table (or the list). Accordingly, the inventors of the present application have conceived of a configuration in which, when a reply mail has a quotation from a past mail in the body and when the quotation includes newly-added information, the information-added part is determined as a changed portion from which schedule information is to be extracted.

Figure 4:
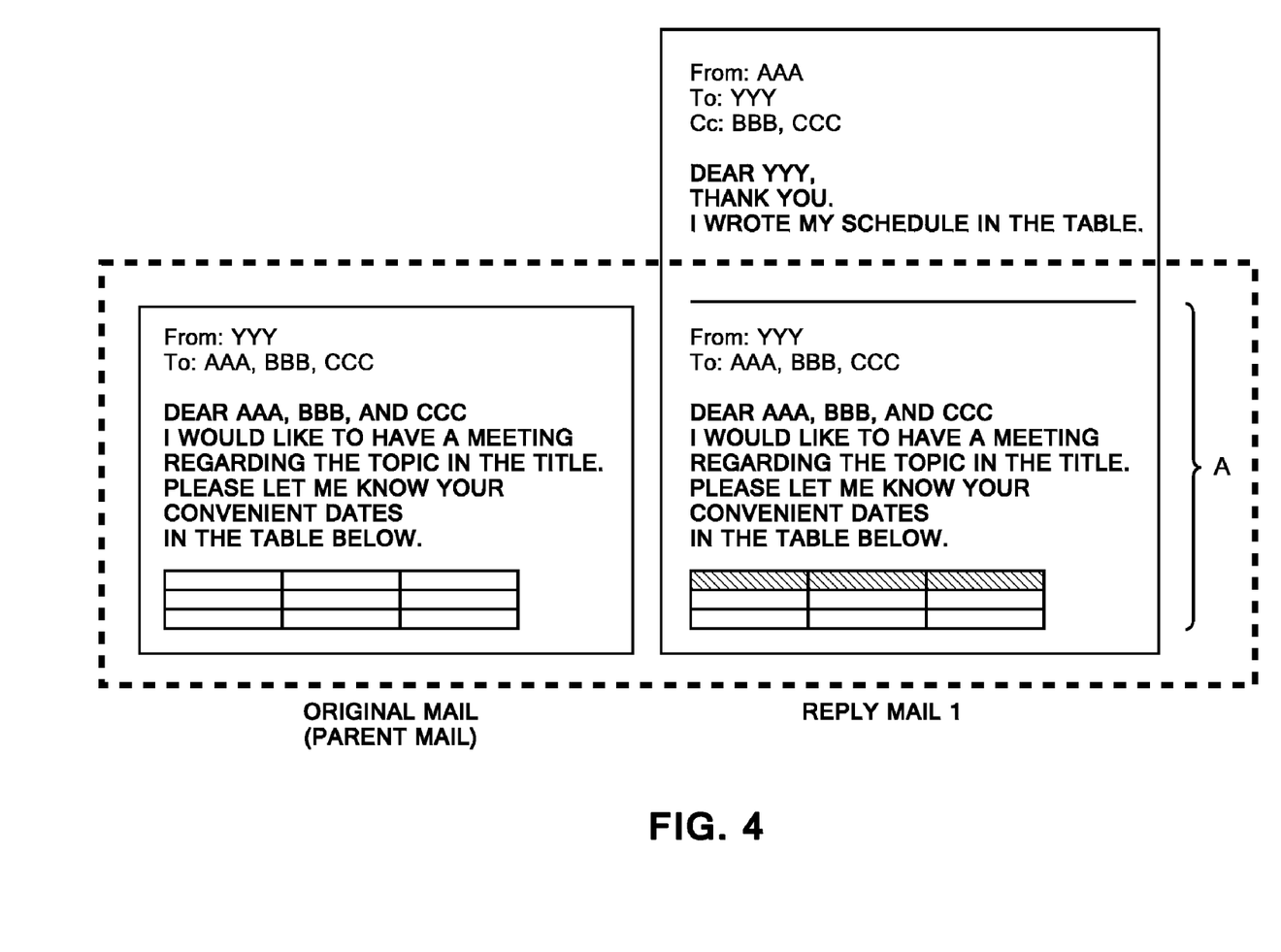
FIG. 4 shows an example of a reply mail and its parent mail.

Now, with reference to FIGS. 4 to 7, a specific description is given of processing of determining a changed portion, which is performed by the changed portion determination unit 120. FIG. 4 shows an original mail and a reply mail 1 replied to the original mail. A sender of the original mail, namely, a meeting holder is YYY, and three people are its destinations: AAA, BBB, and CCC. A schedule inquiry in FIG. 4 uses a table. Further, the reply mail 1 is from AAA, and in this example, a reply has been made by writing a schedule directly in the inquiry table.

The changed portion determination unit 120 compares a quotation A in the body of the reply mail 1 with the original mail which is the parent mail of the reply mail 1 (see a part indicated by a dotted line), and thereby determines whether or not the reply mail 1 includes differential information newly added. In the example shown in FIG. 4, a schedule is newly written in the table in the quotation (see the shaded area). Accordingly, the changed portion determination unit 120 determines that the reply mail 1 has differential information and determines this portion where the differential information has been added, as a changed portion. Since the portion to be determined as the changed portion is part of the table, the changed portion determination unit 120 determines the entire table as the changed portion, as described earlier.

Figure 5:
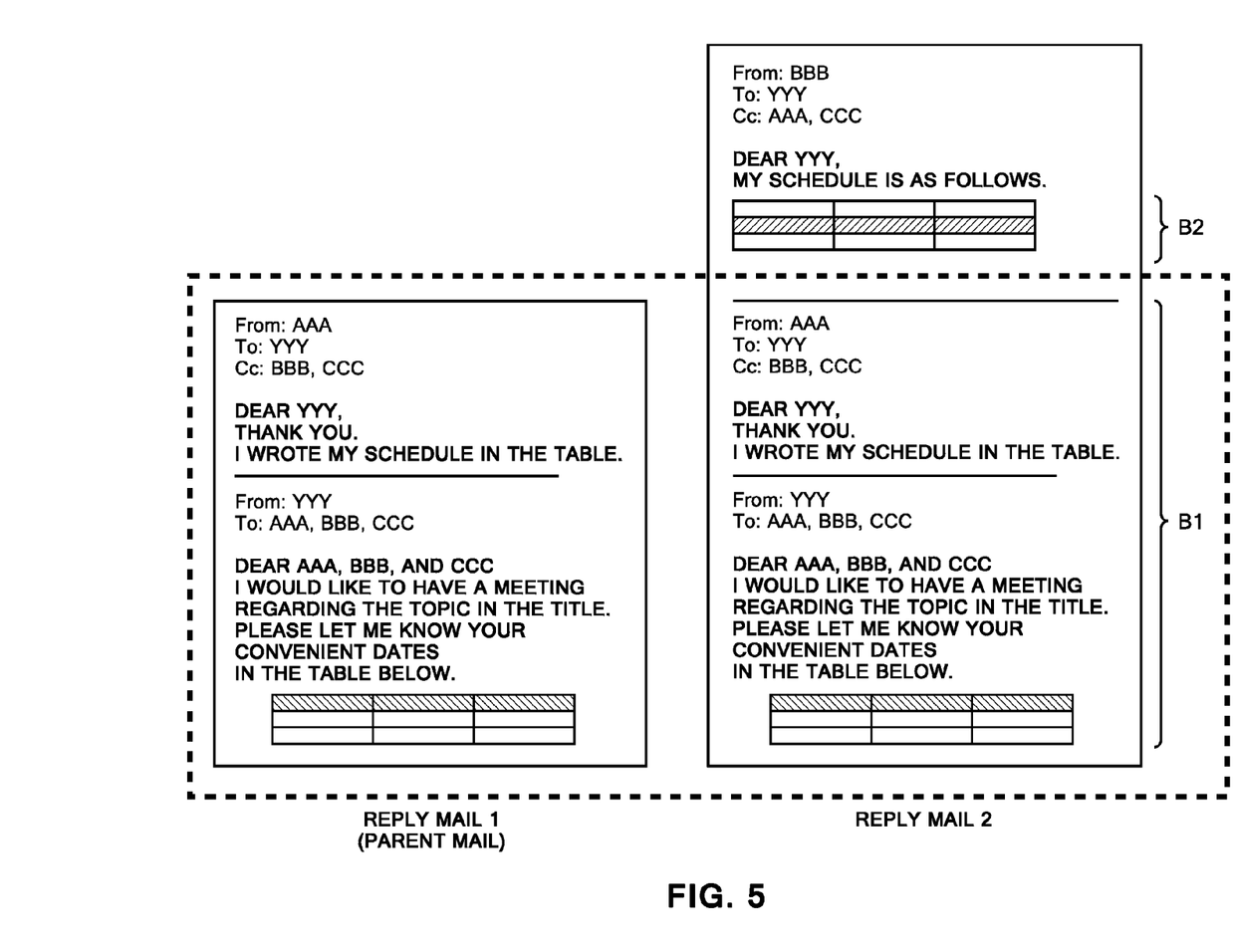
FIG. 5 shows another example of a reply mail and its parent mail.

FIG. 5 shows the reply mail 1 shown in FIG. 4 and a reply mail 2 having the reply mail 1 as its parent mail. The reply mail 2 is a reply mail sent from BBB to the meeting holder YYY. In this example, an original reply part in the body of the reply mail 2 has a copy of the table in the original mail, and a reply has been made by writing a schedule in the copy of the table (see B2).

The changed portion determination unit 120 compares a quotation B1 in the body of the reply mail 2 with the reply mail 1 which is the parent mail of the reply mail 2 (see a part indicated by a dotted line), and thereby determines whether or not the reply mail 2 includes differential information newly added. Since the quotation B1 has no differential information in the example shown in FIG. 5, the changed portion determination unit 120 determines a current mail, namely, an original reply part of the reply mail 2 as a changed portion. Since the portion to be determined as the changed portion includes the table (see B2), the changed portion determination unit 120 determines the entire table as the changed portion, as described above.

Figure 6:
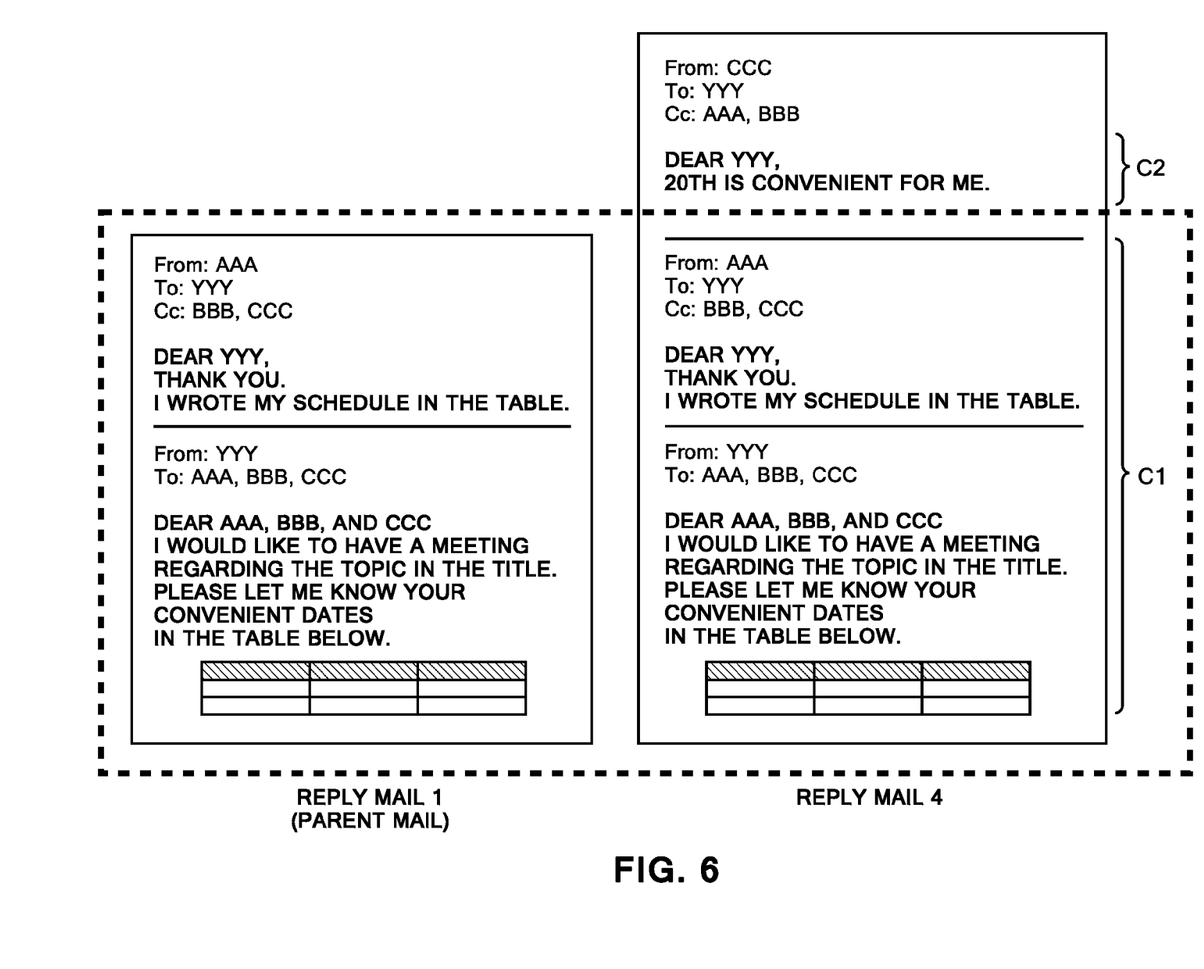
FIG. 6 shows another example of a reply mail and its parent mail.

FIG. 6 shows the reply mail 1 shown in FIG. 4 and a reply mail 4 having the reply mail 1 as its parent mail. The reply mail 4 is a reply mail sent from CCC to the meeting holder YYY. In this example, a reply has been made by writing schedule information in a sentence in an original reply part in the body of the reply mail 4 (see C2).

The changed portion determination unit 120 compares a quotation C1 in the body of the reply mail 4 with the reply mail 1 which is a parent mail of the reply mail 4 (see a part indicated by a dotted line), and thereby determines whether or not the reply mail 4 includes differential information newly added. Since the quotation C1 has no differential information in the example shown in FIG. 6, the changed portion determination unit 120 determines a current mail, namely, an original reply part of the reply mail 4 (see C2) as a changed portion.

Figure 7:
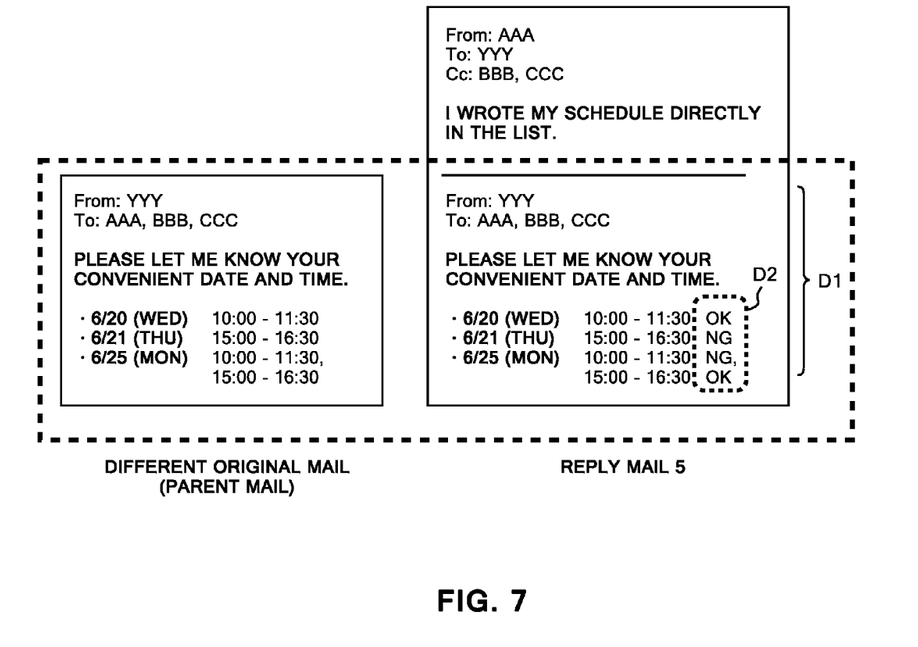
FIG. 7 shows another example of a reply mail and its parent mail.

FIG. 7 shows a different original mail and a reply mail 5 replied to the different original mail. A sender of the different original mail, namely, a meeting holder is YYY, and three people are its destinations: AAA, BBB, and CCC. A schedule inquiry in this example uses a list. Further, the reply mail 5 is from AAA, and in this example, a reply has been made by writing a schedule directly in the inquiry list (see D2).

The changed portion determination unit 120 compares a quotation D1 in the body of the reply mail 5 with the original mail which is a parent mail of the reply mail 5 (see a part indicated by a dotted line), and thereby determines whether or not the reply mail 5 includes differential information newly added. In the example shown in FIG. 7, a schedule is newly written in the list in the quotation (see D2). Accordingly, the changed portion determination unit 120 determines that the reply mail 1 has differential information and determines this portion where the differential information has been added, as a changed portion. Since the portion to be determined as the changed portion is part of the list, the changed portion determination unit 120 determines an entire row of the list as the changed portion. In this example, each row has differential information. Accordingly, the entire list is determined as the changed portion.

The reference rule storage unit 125 stores rules or statistical information used to extract schedule information from the changed portion determined by the changed portion determination unit 120. Here, the schedule information is information indicating date and day such as "June 14th (Tue)," "6/14," or "Tuesday the 14th," and information indicating time such as "14:00 to 15:00," "14 to 15," "AM/PM," or "in the afternoon/in the morning." The reference rule storage unit 125 stores the rules or statistical information used to extract a character string representing date and day, and/or time in any style.

A rule for extracting information on date may be, for example, for extracting a character string that matches any of "Month Date," "Month Date Day," "Month Date (Day)," "Date," "Date Day," "Date (Day)," "MM/DD," and "YYYY/

MM/DD." Moreover, a rule for extracting information on time may be, for example, for extracting a character string that matches any of or a combination of "HH:MM," "x o'clock," "AM/PM," and "in the morning/in the afternoon." In addition, the reference rule storage unit 125 may also store rules used to determined whether the schedule information extracted using those rules indicates convenient date and time or inconvenient date and time.

A rule for determining that the schedule information indicates convenient date and time may be, for example, for determining that date and time indicated by the schedule information is convenient when a character string that matches any of the following character strings and symbols is detected and when there is a character string indicating date and time before or after the character string. The character strings include "convenient," "preferred," "OK/available," "free," "no problem," and the like, and the symbols include a double circle, a circle, a triangle, and the like. In addition, a rule for determining that the schedule information indicates inconvenient date and time may be, for example, for determining that date and time indicated by the schedule information is inconvenient when a character string that matches any of the following character strings and symbol is detected and when there is a character string indicating date and time before or after the character string. The character strings include "inconvenient," "not preferred," "not available," "not free," "busy," "except for," "avoid," and the like, and the symbols include a cross mark and the like. Note that the information on the character strings that can indicate convenience or inconvenience is collectively called availability information below.

For each reply mail, the schedule information extractor 130 reads a corresponding changed portion from the reply mail storage unit 110, and thereby extracts schedule information from the changed portion by referring to the rules or statistical information stored in the reference rule storage unit 125. Note that the schedule information extractor 130 may extract only schedule information indicating convenient date and time by referring to the rules or statistical information. Alternatively, the schedule information extractor 130 may extract information indicating date and time with its availability information by referring to the rules or statistical information. Then, the schedule information extractor 130 stores the extracted schedule information and an identifier of a sender of the corresponding reply mail in the extracted schedule storage unit 135 in association with each other.

To be more specific, the schedule information extractor 130 first determines whether the changed portion includes a table or not. When the reply mail is an email in HTML format or in Rich Text Format, the schedule information extractor 130 determines presence or absence of a table based on whether a Table object is included or not. When the reply mail is a plain text email, the schedule information extractor 130 can determine presence or absence of a table based on an appearance frequency of, for example, "−" or "+." In this way, whether or not the changed portion includes a table is first determined, and when there is a table, the schedule information is extracted from the table only. Thereby, parsing and analysis of a natural sentence can be performed only when it is truly needed.

Having determined that the changed portion includes a table, the schedule information extractor 130 first reads a record (row) whose value in a column named "name" or whose value in the first column is the name of the sender of the reply mail. Then, by referring to the rules stored in the reference rule storage unit 125, the schedule information extractor 130 specifies a column having a value indicating that certain date and time is free, such as "available," a circle or square, or "OK." Next, the schedule information extractor 130 extracts the name of all the specified columns as schedule information, and stores the schedule information and the name of the sender of the reply mail in the extracted schedule storage unit 135 in association with each other.

Note that, when there is an email address in the Sender field of the header information of the reply mail and when the table has multiple records, the schedule information extractor 130 reads the record information described earlier from the reply mail storage unit 110, and specifies a record (row) from which the schedule information is to be extracted.

On the other hand, having determined that the changed portion includes no table, the schedule information extractor 130 refers to the rules or statistical information stored in the reference rule storage unit 125 and thereby performs pattern matching in order to extract schedule information and its availability information from a natural sentence or a list. To be more specific, the schedule information extractor 130 performs morphological analysis on the natural sentence to divide the sentence into words. Thereafter, the schedule information extractor 130 specifies a word indicating date and time and its availability information by using the rules or statistical information. Moreover, the schedule information extractor 130 acquires a value in the Sender field of the header information, the value being an identifier of the sender of the reply mail. Then, the schedule information extractor 130 stores the extracted schedule information and the value in the Sender field in the extracted schedule storage unit 135 in association with each other. Here, the schedule information extractor 130 may store, in the extracted schedule storage unit 135, only schedule information indicating convenient date and time, based on the specified availability information.

When the schedule information cannot be extracted using any of the rules and the statistical information stored in the reference rule storage unit 125, the schedule information extractor 130 extracts the entire changed portion as the schedule information. For example, when a natural sentence has vague information on date and time, such as "I am busy tomorrow," "Tuesday next week is convenient for me," "I would like the meeting to be rescheduled for next month," "I am free after the working hours," or "I prefer the meeting to be held first thing in the morning," the schedule information extractor 130 extracts the entire natural sentence as the schedule information. This is because the present invention aims to organize schedules from the repliers, and therefore even such vague information is useful for a user to set the schedule.

Preferably, the schedule information extractor 130 normalizes the schedule information such as date and time by using pattern-matching rules or the like. The normalization here means to unify the representation formats of date and time. Specifically, when date representations are not unified, such as "Month Date," "MM/DD," and "YYYY/MM/DD," these are unified into a representation format of "MM/DD" for example. Similarly, when time representations are not unified, such as "HH:MM," "x o'clock in the afternoon," and "x AM," these are unified into a representation format of "HH:MM" for example. Note that the representation format into which to unify the representations may be stored in advance in the reference rule storage unit 125 as part of the rules.

Preferably, the schedule information extractor 130 stores the extracted schedule information and timestamp information of the reply mail from which the schedule information has been extracted, in the extracted schedule storage unit 135 in association with each other. Since there might be a case where the same replier sends a reply mail multiple times for such purposes as correcting or changing the schedule information, the timestamp information is stored to provide a criterion for selecting schedule information to be used.

Figure 8:
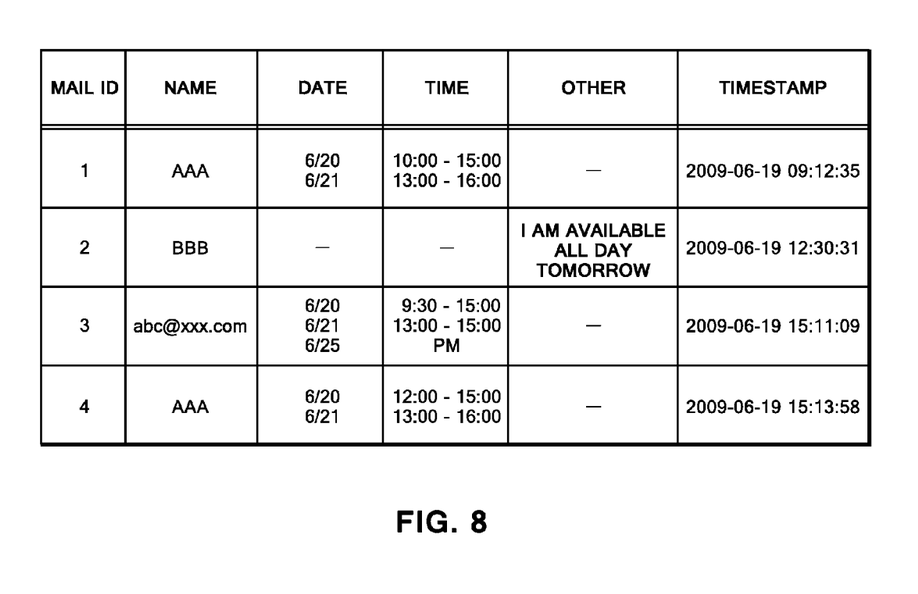
FIG. 8 shows an example of schedule information stored in an extracted schedule storage unit 135 according to the embodiment.

FIG. 8 shows an example of a table of schedule information pieces stored in the extracted schedule storage unit 135 in which the schedule information extractor 130 has stored convenient schedule information only. As can be seen in FIG. 8, the schedule information of each replier is normalized, and is registered in the table as separate date and time in association with a replier name and a timestamp. For a mail ID=3, since a name was not acquirable from the table or the header information, an email address is registered in the Name field. Further, for a mail ID=2, since schedule information indicating date and time was not extractable using the rules, the Date field and the Time field are both in blank. Instead, a natural sentence extracted as-is is registered in the Other field.

The summary information creator 140 reads a combination of schedule information and an identifier of the corresponding sender from the extracted schedule storage unit 135, and creates summary information including a schedule of each person replied to the schedule inquiry mail. For example, the summary information may be created in a table.

In addition, if multiple schedule information pieces having the same sender identifier are stored in the extracted schedule storage unit 135, the summary information creator 140 creates the summary information by using a combination of schedule information associated with latest timestamp information and an identifier of the corresponding sender. In the example shown in FIG. 8, a mail ID=1 and a mail ID=4 have the same value in the Name field. In such a case, their timestamp values are compared to each other, and a newer record, namely the schedule information of the mail ID=4 is used.

Figure 9:
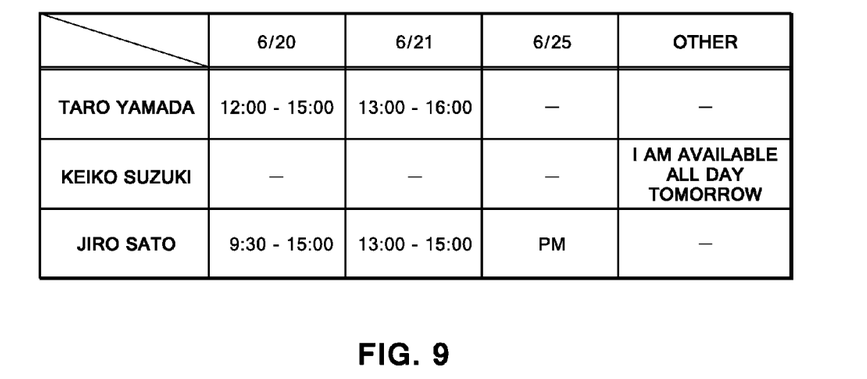
FIG. 9 shows an example of a summary table created by a summary information creator 140 according to the embodiment.

FIG. 9 shows an example of summary information created by the summary information creator 140. In this table, a schedule of each replier is shown for each date. Here, "–" in the table indicates that there is no information in that field. Also in the example shown in FIG. 9, a natural sentence extracted as-is because the rules were not applicable is registered in the Other field. The summary information thus created is outputted to an output device such as the display device 11 or a printer so as to be presented to the user. Based on the summary information outputted, the user can set the final date, or readjust the date.

Figure 10:
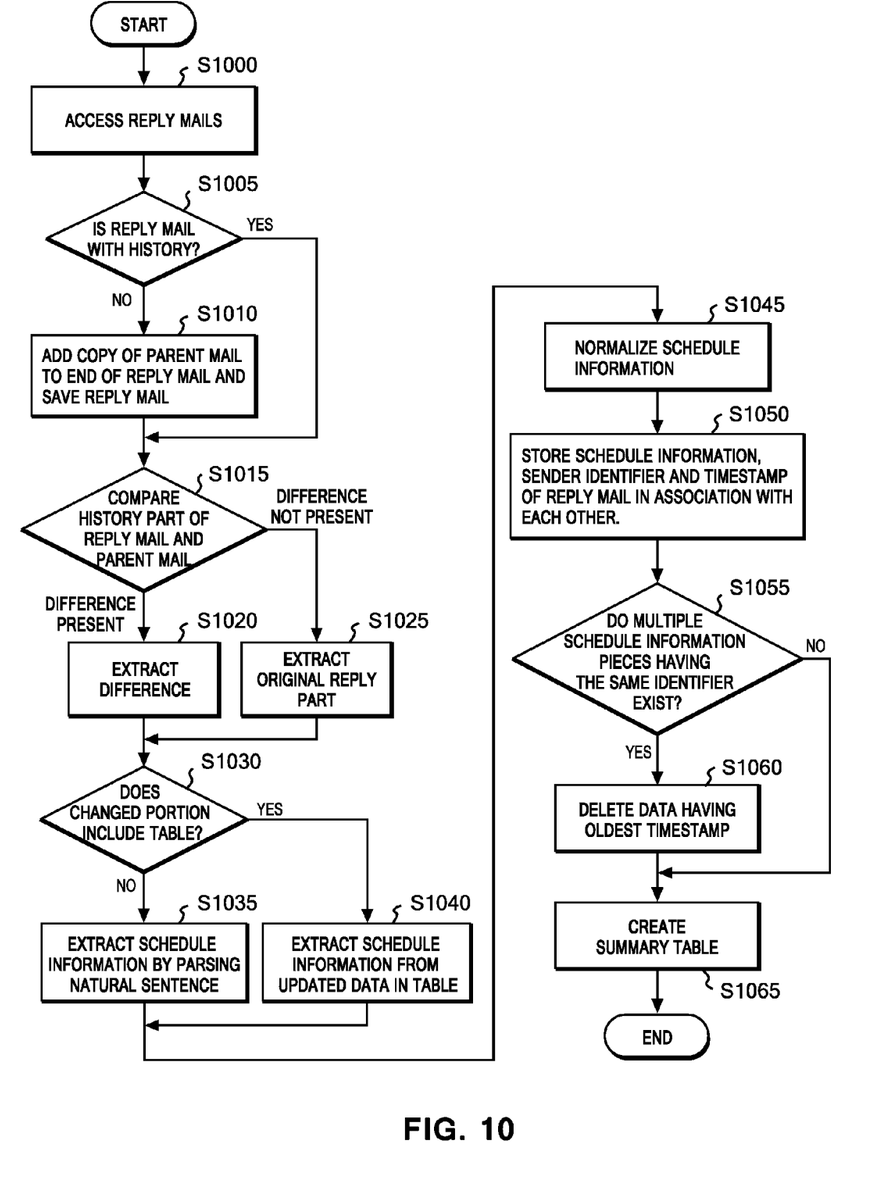
FIG. 10 is a flowchart showing an example of a flow of schedule adjustment assisting processing according to the embodiment.

Next, referring to FIG. 10, a flow of schedule adjustment assisting processing performed by the schedule adjustment assisting apparatus 100 is described. The processing starts in Step 1000 where, in response to a request from a user to organize reply mails, the schedule adjustment assisting apparatus 100 accesses multiple reply mails and stores them in the reply mail storage unit 210. Next, the schedule adjustment assisting apparatus 100 reads the reply mails one by one from the reply mail storage unit 210, and determines, for each reply mail, whether or not the reply mail has a history, namely, includes a quotation from its parent mail in the body (Step 1005). When the reply mail does not have a history (Step 1005: NO), a copy of the parent mail is added to the body of the reply mail, and the reply mail originally stored in the reply mail storage unit 210 is replaced with the new reply mail (Step 1010).

When the reply mail has a history (Step 1005: YES) or after Step 1010, the processing proceeds to Step 1015 where the schedule adjustment assisting apparatus 100 reads the reply mails one by one out of the reply mail storage unit 210 and, for each reply mail, compares the history part of the reply mail with its parent mail and thereby determines whether or not the reply mail has newly-added differential information.

When the reply mail has newly-added differential information (Step 1015: YES), the schedule adjustment assisting apparatus 100 extracts the differential information as a changed potion (Step 1020). On the other hand, when the reply mail does not have newly-added differential information (Step 1015: NO), the schedule adjustment assisting apparatus 100 determines an original reply part in the body as a changed portion, and extracts the changed portion (Step 1025).

From Step 1020 or Step 1025, the processing proceeds to Step 1030 where the schedule adjustment assisting apparatus 100 next determines whether a part determined as the changed potion includes table data or not. When the changed portion includes no table data (Step 1030: NO), the schedule adjustment assisting apparatus 100 performs parsing and analysis on a natural sentence or a list in accordance with the rules stored in the reference rule storage unit 125, and thereby extracts schedule information and its availability information (Step 1035).

On the other hand, when the changed portion includes table data (Step 1030: YES), the schedule adjustment assisting apparatus 100 uses an attribute name in the table to extract schedule information from updated data in the table, in accordance with the rules stored in the reference rule storage unit 125 (Step 1040).

After the extraction of the schedule information, the schedule adjustment assisting apparatus 100 normalizes date and time in accordance with the rules stored in the reference rule storage unit 125 (Step 1045). Then, the schedule adjustment assisting apparatus 100 stores the schedule information and a sender identifier (name or email address) and a timestamp of the corresponding reply mail, in the extracted schedule storage unit 135 in association with each other (Step 1050).

After the schedule information extraction is finished for all the reply mails, the schedule adjustment assisting apparatus 100 determines whether or not multiple schedule information pieces having the same identifier are registered in the extracted schedule storage unit 135 or not (Step 1055). When multiple records are registered for the same identifier (Step 1055: YES), among the multiple records having the same identifier, the schedule adjustment assisting apparatus 100 leaves only a record having the latest timestamp, and deletes the rest (Step 1060).

When a single record is registered for one identifier (Step 1055: NO) or after Step 1060, the processing proceeds to Step 1065 where the schedule adjustment assisting apparatus 100 creates a summary table showing a schedule of each person, based on their schedule information stored in the extracted schedule storage unit 135. Then, the processing ends.

The invention of the present application can automatically extract schedule information from reply mails even if the reply mails replied to a schedule inquiry mail do not have a unified format, and therefore allows smooth schedule adjustment. Other effects of the present invention will be understood from the embodiment given below.

The present invention has been described above through the embodiment. However, the technical scope of the present invention is not limited to the above embodiment. For example, in the above embodiment, processing of changing a reply mail without history to a reply mail with history is performed as preprocessing so that schedule information can be extracted from all the reply mails by using the same processing. However, without performing such preprocessing, processing contents may be changed depending on whether the reply mail has a history of a past mail. When such configuration is employed, in a case where the determination result in Step 1005 is NO in the flowchart shown in FIG. 10, the processing may go to Step 1025 by skipping the processing in Step 1010.

As described, it is apparent to those skilled in the art that various modifications and improvements can be made to the above embodiment. It is apparent from descriptions in Claims that such modified or improved embodiments are also included in the technical scope of the present invention.

It should be noted that the apparatus, system, program, and method described in Claims, Description, and Drawings can be implemented in any processing execution order of operations, procedures, steps, and stages unless it is particularly stated using such words as "before" or "prior to" and unless an output of prior processing is used in the later processing. Even if a description is given using such words as "first" and "next" in the operation flow in Claims, Description, and Drawings, such words are used for convenience, and do not mean that the flow has to be executed in the order implied by those words.

What is claimed is:

1. A schedule adjustment assisting program executed in an information processing apparatus including a processor and storage means, the information processing apparatus being capable of accessing a plurality of reply mails either directly or indirectly replied to a schedule inquiry mail, the schedule adjustment assisting program causing the information processing apparatus to execute the steps of:

the processor accessing the plurality of reply mails in response to a request from a user of the information processing apparatus;

the processor determining that a changed portion in each of the reply mails is a part where information is newly added, on condition that a body of the reply mail includes a quotation from a past mail and that the newly-added information is in the quotation, and otherwise, determining that the changed portion is an original reply part in the body of the current mail;

for each of the reply mails, the processor extracting schedule information on a schedule from the changed portion, and storing the schedule information in the storage means and a sender identifier of the reply mail in association with each other; and the processor reading a combination of the schedule information and the corresponding sender identifier from the storage means, and creating summary information including a schedule of each person replied to the schedule inquiry mail.

2. The schedule adjustment assisting program according to claim 1, wherein for each of the reply mails, the processor compares the quotation from the past mail in the body of the reply mail with a parent mail to which the reply mail has been replied, and determines whether or not the body of the reply mail includes newly-added information in the quotation from the past mail.

3. The schedule adjustment assisting program according to claim 2, wherein for each of the reply mails, the processor adds a copy of the parent mail of the reply mail to the body of the reply mail on condition that the body of the reply mail does not include the quotation from the past mail.

4. The schedule adjustment assisting program according to claim 1, wherein on condition that a portion to be determined as the changed portion is part of a table or includes a table, the processor determines the entire table as the changed portion, and on condition that the changed portion includes a table, the processor extracts the schedule information from the table only.

5. The schedule adjustment assisting program according to claim 1, wherein on condition that a portion to be determined as the changed portion is part of a list or includes a list, the processor determines an entire row of the list as the changed portion, and on condition that the changed portion includes a row of a list, the processor extracts the schedule information from the changed portion only.

6. The schedule adjustment assisting program according to claim 1, wherein the information processing apparatus includes rule-information storage means for storing rule information for specifying the schedule information, and the processor extracts the schedule information from the changed portion in reference to the rule information.

7. The schedule adjustment assisting program according to claim 6, wherein on condition that the rule-information storage means does not store the rule information usable, the processor extracts the entire changed portion as the schedule information.

8. The schedule adjustment assisting program according to claim 1, wherein the processor normalizes the extracted schedule information into a predetermined format, and the processor outputs the created summary information to an output unit of the information processing apparatus.

9. The schedule adjustment assisting program according to claim 1, wherein the processor stores the extracted schedule information and timestamp information of the reply mail from which the schedule information is extracted, in the storage means in association with each other, and on condition that the storage means stores a plurality of pieces of the schedule information having the same sender identifier, the processor creates the summary information by using a combination of the schedule information associated with the latest timestamp information and the same sender identifier.

10. A schedule adjustment assisting method executed by an information processing apparatus including a processor and storage means, the information processing apparatus being capable of accessing a plurality of reply mails either directly or indirectly replied to a schedule inquiry mail, the schedule adjustment assisting method comprising the steps of:

(a) the processor accessing the plurality of reply mails in response to a request from a user of the information processing apparatus;

(b) the processor determining that a changed portion in each of the reply mails is a part where information is newly added, on condition that a body of the reply mail includes a quotation from a past mail and that the newly-added information is in the quotation, and otherwise, determining that the changed portion is an original reply part in the body of the current mail;

(c) for each of the reply mails, the processor extracting schedule information on a schedule from the changed portion, and storing the schedule information in the storage means and a sender identifier of the reply mail in association with each other; and (d) the processor reading a combination of the schedule information and the corresponding sender identifier from the storage means, and creating summary information including a schedule of each person replied to the schedule inquiry mail.

11. A schedule adjustment assisting apparatus capable of accessing a plurality of reply mails either directly or indirectly replied to a schedule inquiry mail, the schedule adjustment assisting apparatus comprising:

access means for accessing the plurality of reply mails in response to a request from a user of the information processing apparatus;

changed portion determination means for determining that a changed portion in each of the reply mails is a part where information is newly added, on condition that a body of the reply mail includes a quotation from a past mail and that the newly-added information is in the quotation, and otherwise, determining that the changed portion is an original reply part in the body of the current mail;

extraction means for extracting schedule information on a schedule from the changed portion, for each of the reply mails;

storage means for storing the extracted schedule information and a sender identifier of the corresponding reply mail in association with each other; and summary information creation means for reading a combination of the schedule information and the corresponding sender identifier from the storage means, and creating summary information including a schedule of each person replied to the schedule inquiry mail.

* * * * *